(12) United States Patent
Wu

(10) Patent No.: US 6,724,633 B1
(45) Date of Patent: Apr. 20, 2004

(54) SECTIONAL COMPUTER HOUSING

(75) Inventor: James Wu, Taipei (TW)

(73) Assignee: Apoint International Co., Ltd. & Bytech Inc., Taipei (TW)

(*) Notice: Subject to any disclaimer, the term of this patent is extended or adjusted under 35 U.S.C. 154(b) by 0 days.

(21) Appl. No.: 10/428,774

(22) Filed: May 5, 2003

(51) Int. Cl.$^7$ ................................................ G06F 1/16
(52) U.S. Cl. ..................... 361/726; 312/265.5; 206/372; 235/145 R
(58) Field of Search ................................ 361/679–687, 361/724–727; 312/265.5, 236; 206/372, 373; 235/1 D, 145 R; 160/371; 52/474; 364/708.1

(56) References Cited

U.S. PATENT DOCUMENTS 5,687,063 A * 11/1997 Chabert ..................... 361/726
6,024,335 A * 2/2000 Min ............................ 248/371
6,297,962 B1 * 10/2001 Johnson et al. ............. 361/726
2003/0193782 A1 * 10/2003 Chen .......................... 361/726

* cited by examiner

Primary Examiner—Hung Van Duong

(57) ABSTRACT

A sectional computer housing includes a plurality of frame posts and a plurality of sectional panels molded using aluminum extrusion. Each of the frame posts is provided with a screw groove at one side thereof and a track at two adjacent sides to the side having the screw groove, respectively. Each of the sectional panel having a turtledove tail-shaped protruding seat at one end thereof and a track at the other end thereof. A plurality of sectional panels is similarly fastened to one another using the protruding seats and the tracks at one side thereof for forming side, top or bottom panels. Outermost protruding seats and the tracks are coordinated with the tracks of the frame posts, and further positioned by longitudinally penetrating screws through the sectional panels and into the screw grooves of the frame posts, thereby assembling into a computer housing having any desired dimensions.

2 Claims, 6 Drawing Sheets

SECTIONAL COMPUTER HOUSING

BACKGROUND OF THE INVENTION (a) Field of the Invention

The invention relates to a sectional computer housing, and more particularly, to a sectional computer housing molded by aluminum extrusion and assembled using especially designed tracks and protruding portions, thereby forming a computer housing having most appropriate dimensions.

(b) Description of the Prior Art

For whether prior horizontal or vertical computer housings, industrialists have adopted same and fixed dimensions thereof, and the reason behind is for attending to universality considerations. A structure according to a the prior computer housing comprises a U-shaped base and an inverted U-shaped cover, which are combined to each other to form a final structure after being fastened using screws. Although the aforesaid structure is indeed simple, the usage thereof is hardly regarded as convenient: a space for assembly of components at an interior of the computer housing is restricted because of the fixed dimensions of the computer housing. The internal space of the structure cannot be reduced nor increased, and thus causing the shortcomings below:

1. For a first-time computer buyer, one may not need many related accessories, and thus it is redundant to prepare a computer housing having a large size. However, a computer housing of fixed dimensions is still purchased for it is unlikely for the user to find a computer housing having an appropriate and smaller size as well as taking reserved spaces for possible future accessory and equipment expansions into consideration. The user is end up with an excessively large computer housing that not only occupies much space but also wastes production costs.

2. As in the aforementioned description, the prior computer housing comprises a U-shape base and an inverted U-shaped cover, which then form the computer housing by stamping. Therefore, the prior computer housing is preferably made of iron materials. However, a weight of the prior computer housing then becomes rather heavy, and thus adding another shortcoming to the prior computer housing. If the iron materials are replaced by aluminum materials having a lighter weight, stamping means would be inapplicable for the manufacturing thereof. It is obvious that the prior structure is again disadvantaged.

3. There are numerous accessories and equipments supporting computers available on the market, and although a user is able to make expansions according to one's needs, not all desired accessories and equipments can be accommodated because of fixed dimensions of existing standards. Then externally added or removable hardware equipments have to be used instead. When the hardware equipments are disposed at an exterior of the computer housing, they not only have shortened lifespan caused by dust contaminations and humidity, but also are prone to short circuits once coming into accidental contacts with metal objects. Also, accessing of these externally added hardware equipments is quite inconvenient, and thus adding one more shortcoming to the prior computer housing.

SUMMARY OF THE INVENTION

Therefore, the primary of the invention is to provide a sectional computer housing molded by aluminum extrusion, wherein a plurality of frame posts and a plurality of sectional panels are utilized to easily assemble into a computer housing having any dimensions desired. Apart from economizing volume and production cost, the invention also provides enough room for accommodating accessories and equipments for expansions.

To achieve the aforesaid object, the invention comprises a plurality of frame posts and a plurality of sectional panels molded using aluminum extrusion. Wherein:

each of the frame posts is a square-like post provided with a screw groove at one side thereof and a track at two adjacent sides to the side having the screw groove, respectively, and each of the tracks is disposed with a protruding fastening edge at two inner sides thereof, respectively; and each of the sectional panel comprises a cover panel having a bent panel at one side thereof, and the bent panel is further formed with a turtledove tail-shaped protruding seat at an outer end thereof; the other side of the cover panel is provided with a frame body having an opening facing outward, and an interior of the frame is a track further having protruding edges at two inner sides thereof, respectively.

Using the aforesaid structures, a plurality of sectional panels is fastened to one another similarly using the protruding seats and tracks. In addition, outermost protruding seats and tracks of the sectional panels may be placed into or fastened to the tracks of the frame posts, and further positioned using screws penetrated through the sectional panels into the screw grooves at the frame posts, thereby assembling into a computer housing having most appropriate length, width and height. Not only space of the assembled computer housing is economized, but also the weight thereof is reduced for offering easy usage and practicability.

DETAILED DESCRIPTION OF THE PREFERRED EMBODIMENTS

To better understand the contents of the invention, detailed descriptions shall be given with the accompanying drawings hereunder.

Figure 1:
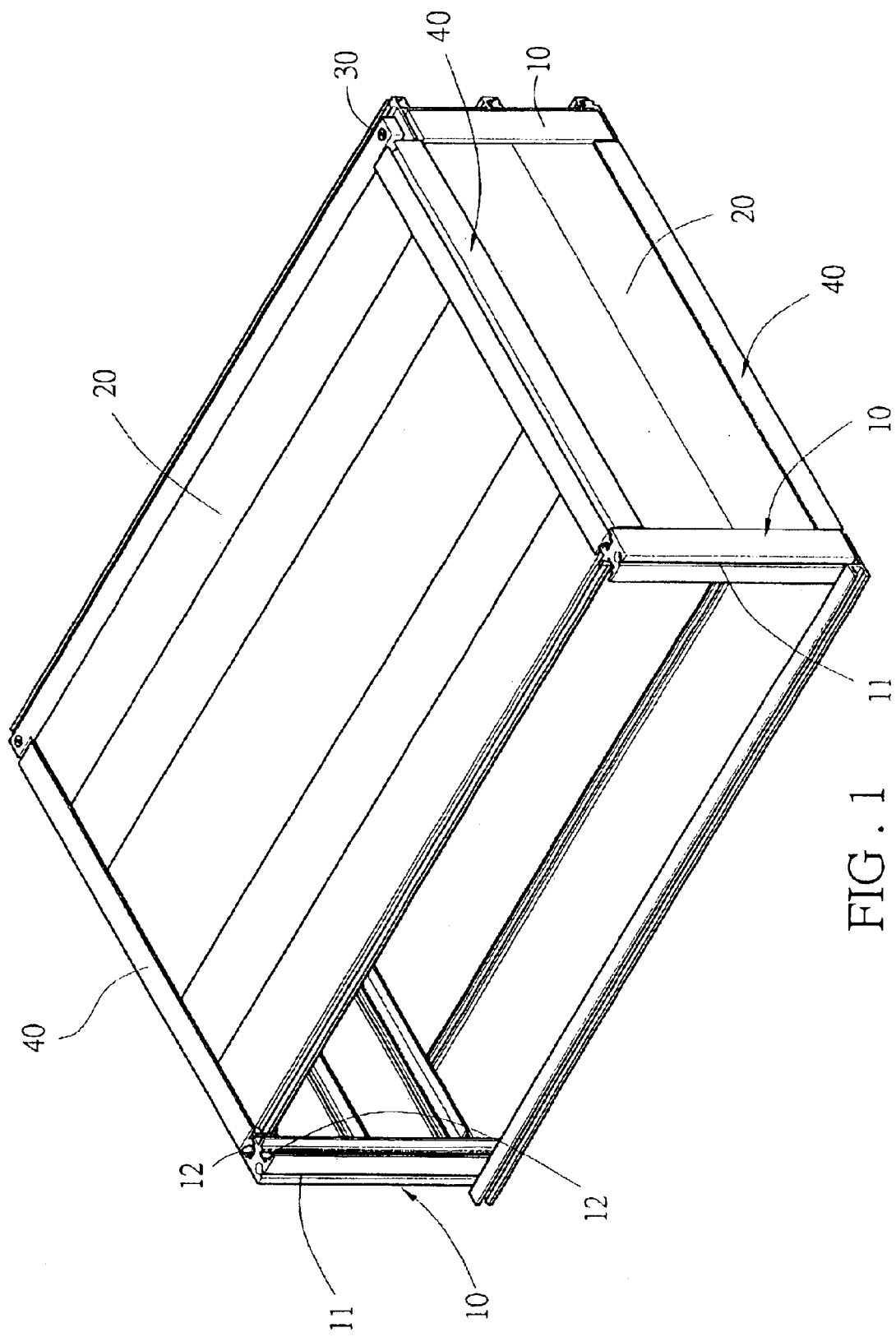
FIG. 1 shows a structural view according to the invention.
Figure 2:
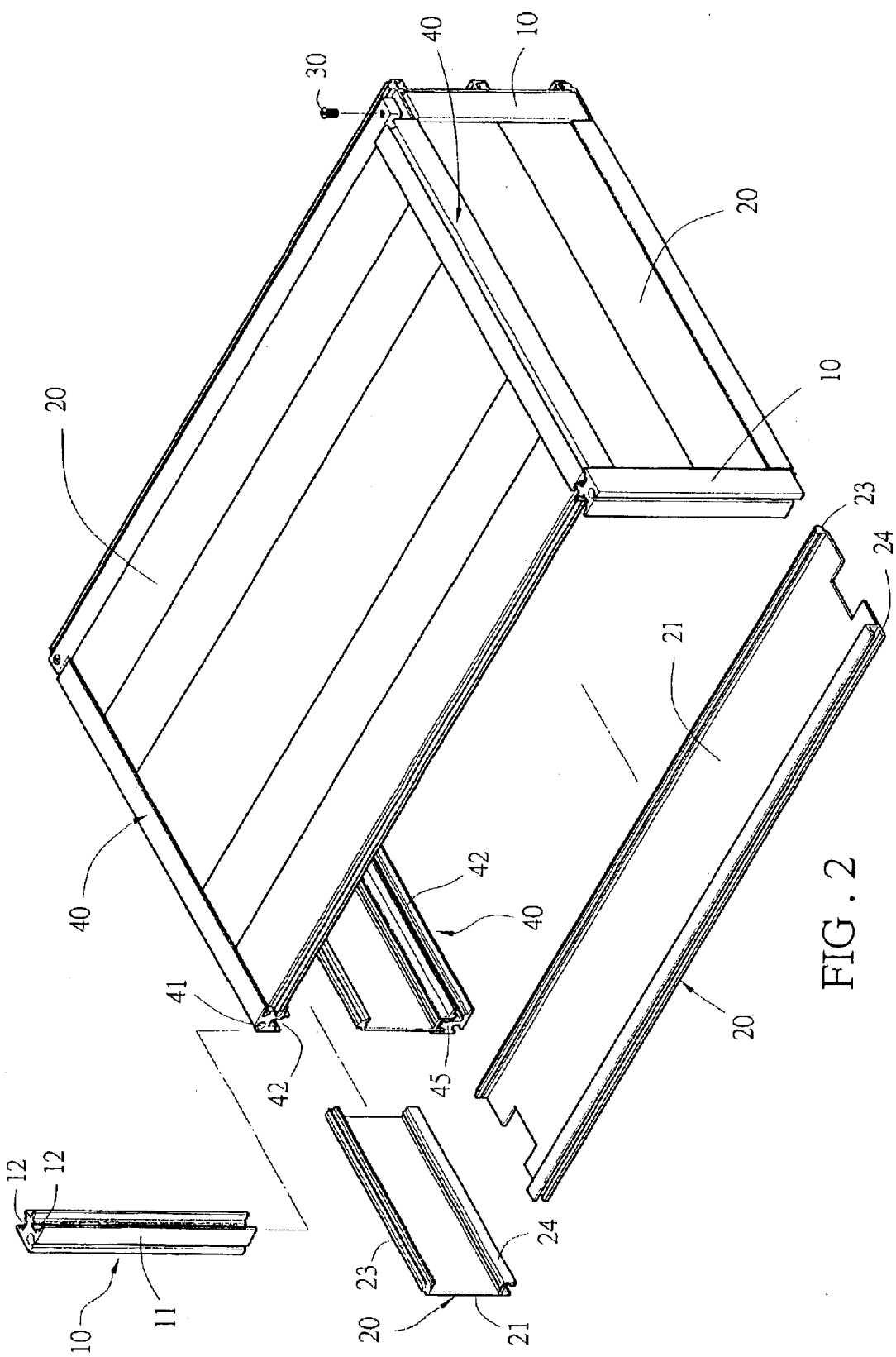
FIG. 2 shows an exploded structural view according to the invention.
Figure 3:
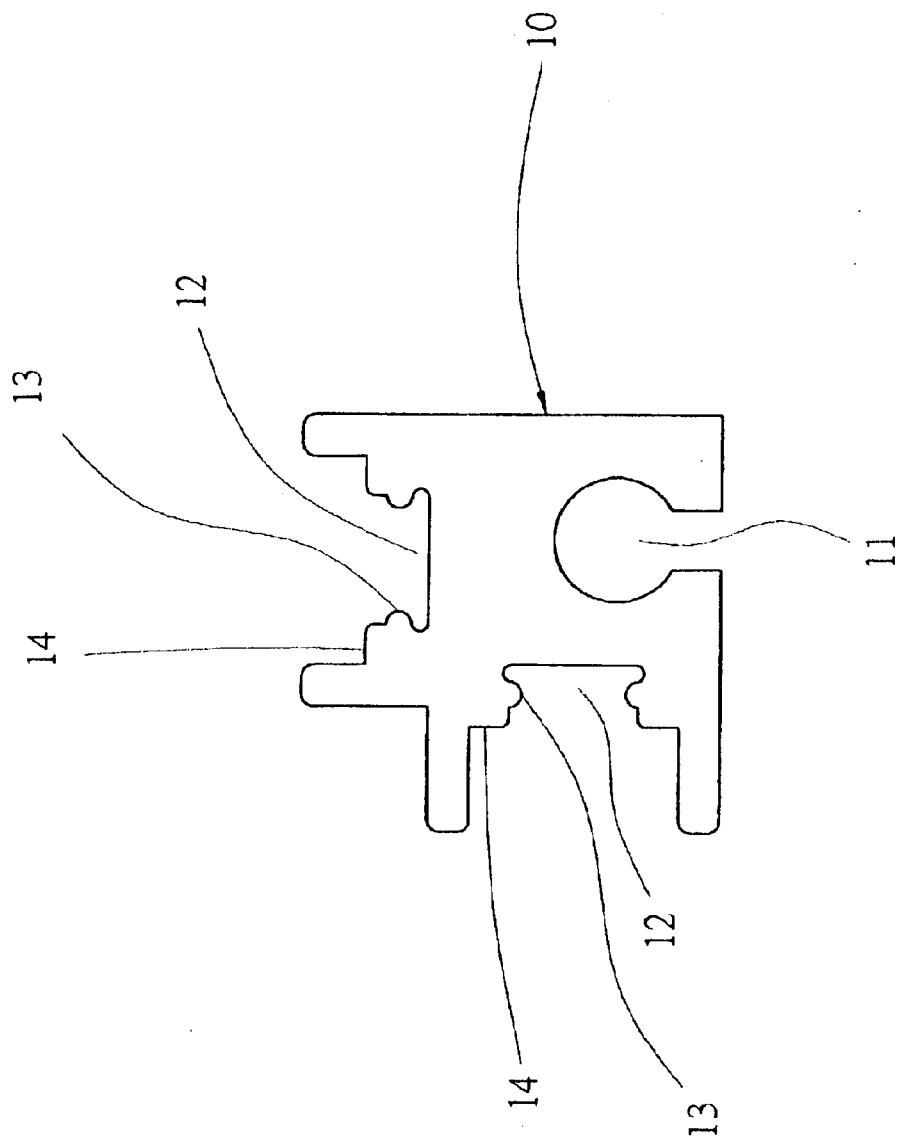
FIG. 3 shows a sectional structural illustrating a vertical frame post according to the invention.
Figure 5:
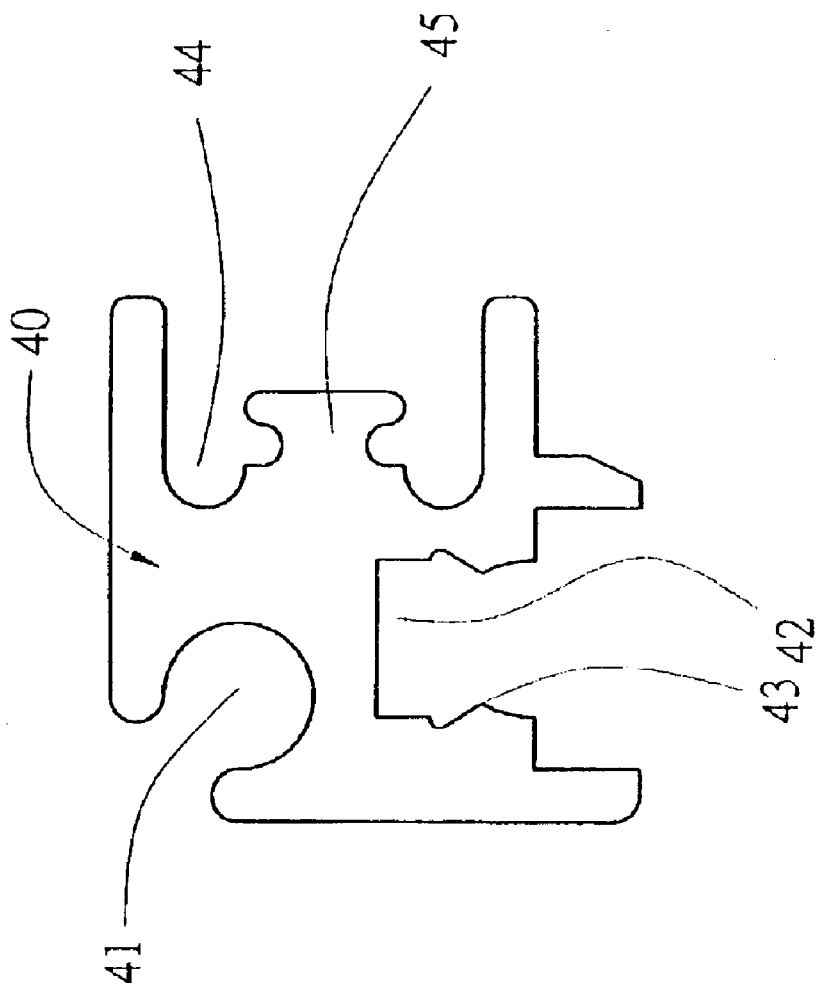
FIG. 5 shows a sectional structural illustrating a horizontal frame post according to the invention.

Referring to FIG. 1, the invention comprises a plurality of frame posts 10 and 40 and a plurality of sectional panels 20 molded by aluminum extrusion. Referring to FIGS. 1 and 2, the frame posts 10 and 40 are in vertical or horizontal dispositions according to a predetermined pattern, and have different structures. Referring to FIGS. 2 and 3, each of the vertical frame posts 10 is a square-like post provided with a screw groove 11 at one side thereof and a track 12 at two adjacent sides to the side having the screw groove 11, respectively. Each of the tracks 12 is disposed with a protruding fastening edge 13 at two inner sides thereof, respectively, and each of the fastening edges 13 forms an enlarged support portion 14 at an open end thereof. Referring to FIG. 5, each of the horizontal frame post 40 is a square-like post provided with a screw groove 41 at one side thereof. One of two adjacent sides to the side having the screw groove 41 is disposed with a track 42 having two fastening edges 43, whereas the other adjacent side is disposed with a track 44 having an inner fastening seat 45 at a bottom end thereof.

Figure 4:
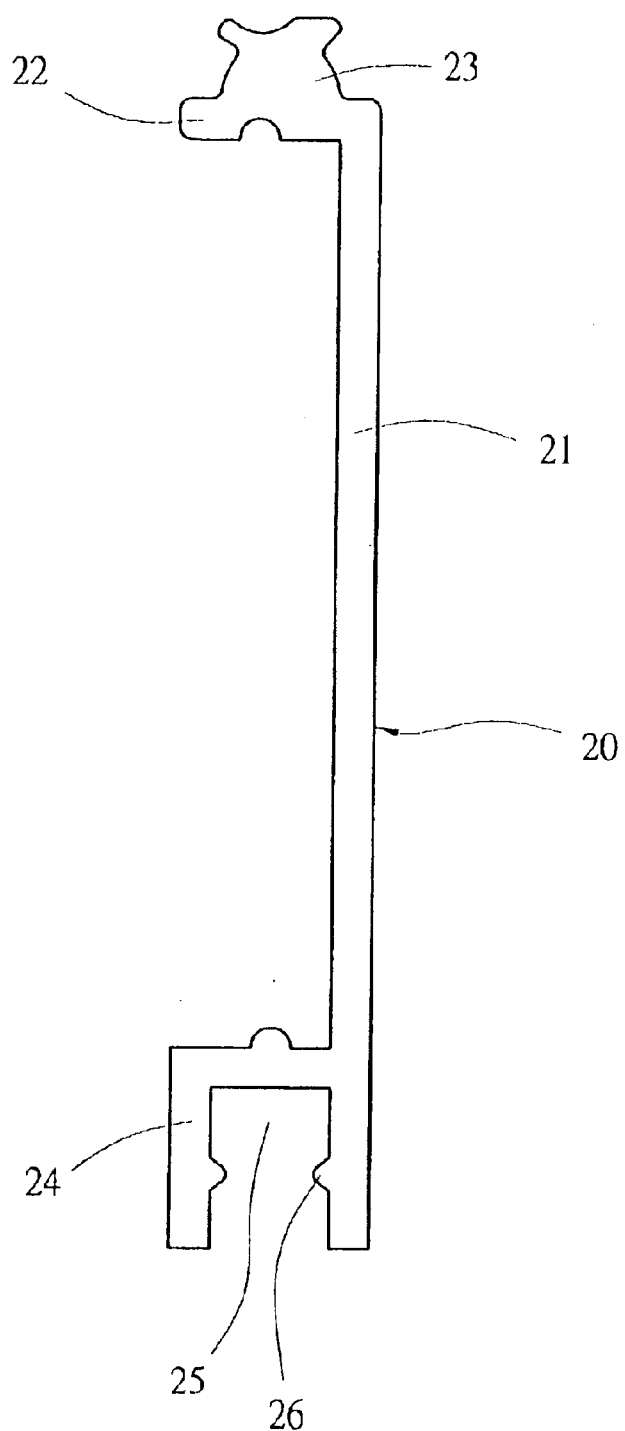
FIG. 4 shows a sectional structural view illustrating a sectional panel according to the invention.

Referring to FIGS. 2 and 4, each of the sectional panel 20 comprises a cover panel 21 having a bent panel 22 at one side thereof, wherein the bent panel 22 is further formed with a turtledove tail-shaped protruding seat 23 at an outer end thereof. The cover panel 21 is provided with a frame body 24 having an opening facing outward at the other side thereof, wherein an interior of the frame 24 is a track 25 further having protruding edges 13 at two inner sides thereof.

Figure 6:
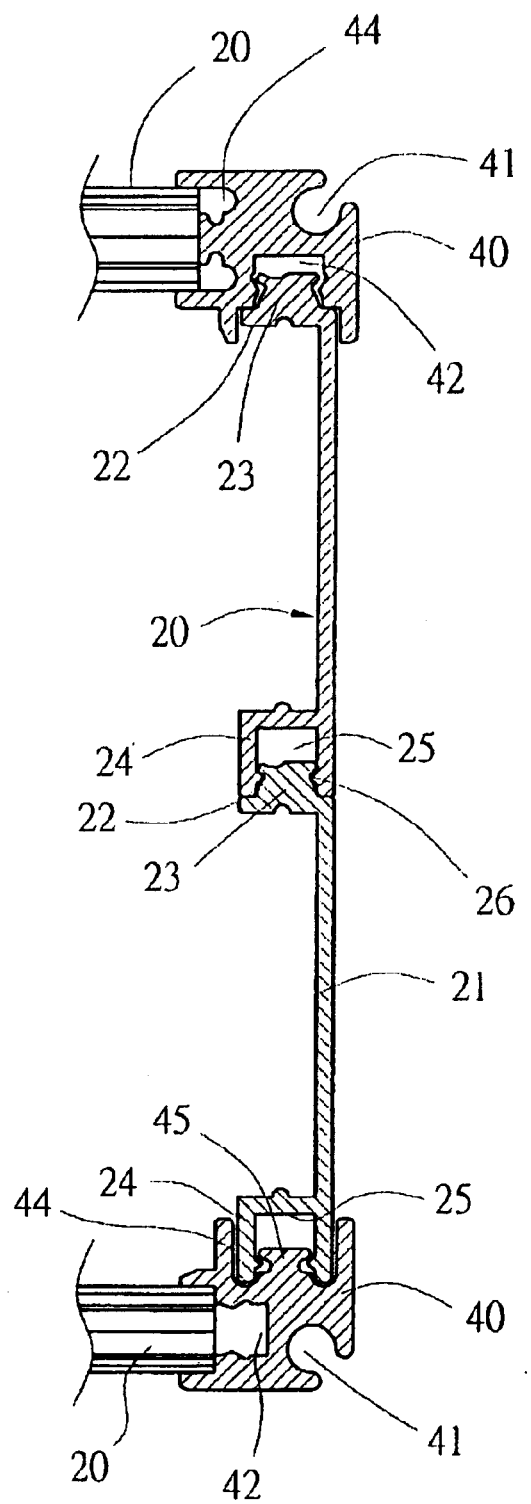
FIG. 6 shows a sectional and side structural view according to the invention having been assembled.

Referring to FIGS. 1 and 2, according to the invention, four vertical frame posts 10 are fundamentally employed. Tracks 12 at the two sides of the vertical frame posts 10 are for placing and positioning of a bottom portion of the sectional panel 10, whereas top portions of the vertical frame posts 10 are for positioning the sectional panel 20 as a top panel of the computer housing or other panels by penetrating screws 30. Referring to FIGS. 1, 2 and 6, the invention is formed using a plurality of sectional panels 20, wherein the protruding seat 23 of one of the sectional panels 20 is fastened to the track 25 of another sectional panel 20, so as to form side, top or bottom panels of a computer housing. Also, outermost protruding seats 23 and the tracks 25 of the aforesaid formed side, top or bottom panels, may all coordinate with the horizontal frame posts 40. Referring to a top section of FIG. 6, the protruding seat 23 of the sectional panel 20 is fastened to the track 42 of the horizontal frame post 40. Referring to a bottom section of FIG. 6, the frame body 24 of the sectional panel 20 is extended into the inner fastening seat 45 at the interior of the track 44. Similar to the aforesaid method, a computer housing is formed using a framework having vertical or horizontal frame posts 10 and 40. The sectional panels 20 having appropriate breadths are then utilized for assembling into a computer housing having suitable dimensions (length, width and height). Furthermore, the size of the computer housing may be changed by adding the number of layers of the sectional panels 20.

The invention has the following advantages when put to use:

1. The sectional computer housing according to the invention may be assembled into a computer housing having an appropriate accommodating room. Therefore, when a user does not have many accessories and equipments, and needs a smaller space, the invention is capable of providing a computer housing having a suitable volume using comparatively less assembled members. On the other hand, on account of expansion in accessories and equipments, number of assembled members may be readily increased for assembling into a computer housing having a comparatively larger space. As a result, spaces are utilized efficiently.

2. The structure according to the invention is molded using aluminum extrusion, and hence the weight thereof is reduced for easy delivery.

3. The computer housing according to the invention is assembled for providing a most appropriate volume and space, and thus all related accessories and equipments may be stored in the computer housing in a most compact manner. Therefore, the accessories and equipments are most suitably protected for enabling components thereof to function according to proper lifespan of the components.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A sectional computer housing comprising a plurality of frame posts and a plurality of sectional panels molded using aluminum extrusion; wherein:

each of the frame posts is a square-like post provided with a screw groove at one side thereof and a track at two adjacent sides to the side having the screw groove, respectively, and each of the tracks is disposed with a protruding fastening edge at two inner sides thereof, respectively;

each of the sectional panels comprises a cover panel of an appropriate breath having a bent panel at one side thereof, and the bent panel is further formed with a turtledove tail-shaped protruding seat at an outer end thereof; the other side of the cover panel is provided with a frame body having an opening facing outward, and an interior of the frame is a track further having protruding edges at two inner sides thereof, respectively;

and the plurality of sectional panels is fastened to one another similarly using the protruding seats and tracks; and outermost protruding seats and tracks of the sectional panels are placed into or fastened to the tracks of the frame posts, and further positioned using screws penetrated through the sectional panels into the screw grooves at the frame posts, thereby assembling into a computer housing having most appropriate length, width and height.

2. The sectional computer housing in accordance with claim 1, wherein the track of the frame post is provided with an inner fastening seat at a center of a bottom portion thereof for directly coordinating with a framework of the sectional panels.

* * * * *